United States Patent [19]
Otani

[11] 3,871,683
[45] Mar. 18, 1975

[54] VEHICLE SAFETY BELT TIGHTENER
[75] Inventor: Syuichi Otani, Tokyo, Japan
[73] Assignee: Nissan Motor Company Limited, Yokohama City, Japan
[22] Filed: Jan. 23, 1974
[21] Appl. No.: 435,992

[30] Foreign Application Priority Data
Jan. 24, 1973  Japan.............................. 48-10430

[52] U.S. Cl. ......................................... 280/150 SB
[51] Int. Cl. ............................................ B60r 21/10
[58] Field of Search ............. 280/150 SB; 180/82 C

[56] References Cited
UNITED STATES PATENTS
3,804,430  4/1974  Fiala ............................ 280/150 SB Primary Examiner—Robert R. Song

[57] ABSTRACT

A closed hollow elongate member is connected at one end to a safety belt and is slidable on a casing, which is fitted in the hollow member and which is fixed to a stationary part of a vehicle with brackets running through slots in the hollow member. The casing contains a pressurized gas producer which is detonated in a collision causing the hollow member to slide such that the belt is tightened.

3 Claims, 4 Drawing Figures

VEHICLE SAFETY BELT TIGHTENER

The present invention generally relates to a safety device for an occupant of a vehicle and particularly to a safety belt device for an occupant of a vehicle.

It is common to employ a safety belt device in a vehicle for preventing a vehicle occupant from being thrown forward from his seat in the event of a collision of the vehicle to protect the occupant from serious injury in a collision of the occupant against structural parts of the vehicle which is called a "second collision." A safety belt device of this type includes seat belts which encircle the torso of the occupant with the terminal ends of the belts secured to fixed parts of the vehicle. The belts are usually worn loosely providing some clearance between the belts and the occupant. This is to give the occupant freedom to perform manipulation of the vehicle or to relax the body of the occupant. The belts thus worn permit the occupant to be moved forward by the large inertial force applied thereto as the result of a collision of the vehicle. Thus, the occupant comes into contact or collides with the belts at a high speed and the internal organs of the occupant may suffer serious injury.

It is, therefore, an object of the invention to provide a tightener of a vehicle safety belt device to automatically tighten belts instantaneously in the event of a collision or rapid deceleration of a vehicle.

Further objects and advantages of the invention will become more apparent from the following detailed description taken in connection with the accompanying drawings in which.

Figure 1:
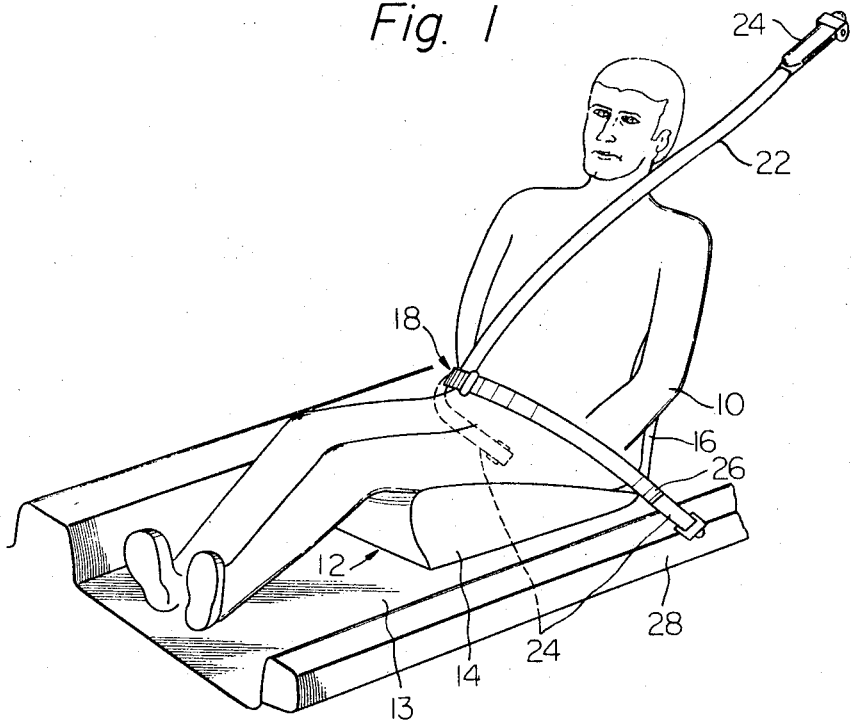
FIG. 1 is a schematic perspective view of a safety belt device in which a tightener according to the invention is employed.

Referring now to FIG. 1, there is shown an occupant 10, a seat 12 mounted in place on a floor frame 13 of a vehicle (not shown) and including a generally horizontal seat portion 14 and an upright backrest portion 16 to accommodate the occupant 10 in the position shown in FIG. 1, and a three end safety belt device 18 provided to encircle the occupant 10 for safety including a shoulder belt 22 extending substantially diagonally over the upper part of the body of the occupant 10 and connected at one end thereof to a suitable fixed part (not shown) of the vehicle through a tightener 24 according to the invention and a hip belt 26 extending substantially transversely of the lap of the occupant's body and connected with the other end of the shoulder belt 22 and connected at both ends thereof respectively to fixed parts 28 of the vehicle through similar separate tighteners 24.

Figure 2:
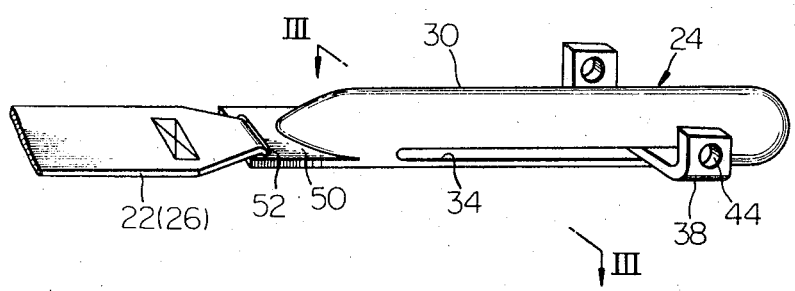
FIG. 2 is a schematic perspective view of a preferred embodiment of a tightener according to the invention.
Figure 3:
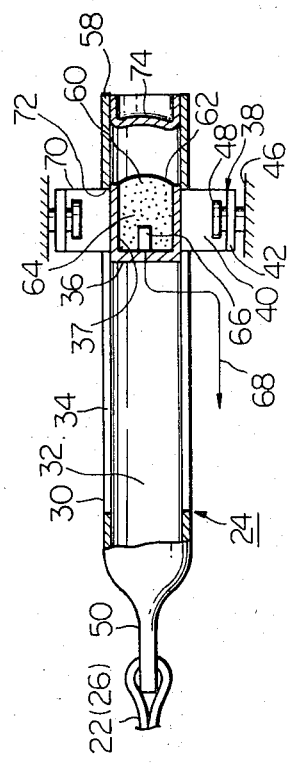
FIG. 3 is a plan view, partly in cross section, taken along a line III—III of FIG. 2.
Figure 4:
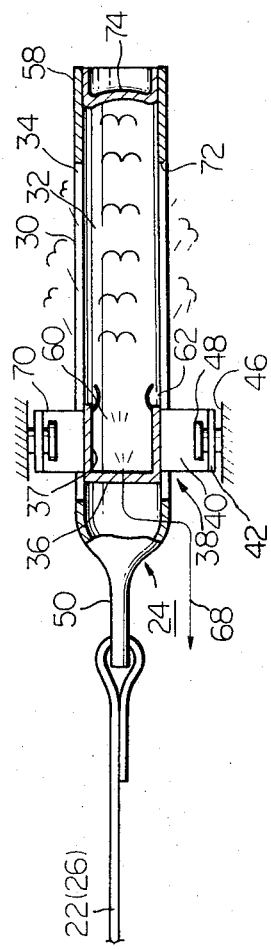
FIG. 4 is a view similar to FIG. 3, but shows a tightener being activated in response to a collision of a vehicle.

Referring now to FIGS. 2 and 3, each tightener 24 is shown to comprise an elongate outer hollow member 30 such as a cylinder which defines a chamber 32 therein and which is closed at opposite ends and which has a longitudinal axis (not shown). The hollow member 30 has formed therein two slots 34 which are of desired length and which extend parallel with the longitudinal axis. A casing or hollow piston 36 is provided which defines a chamber 37 therein and which is fitted in the chamber 32 of the hollow member 30 in such a manner that the hollow member 30 is slidable relative to the casing 36. A pair of brackets 38 are provided for supporting the casing 36 and connecting the same to a stationary part of the vehicle. Each of the brackets 38 has a base 40 which is fixedly secured to the casing 36 and which extends outwardly from the casing 36 transversely to the longitudinal axis of the hollow member 30 through the slots 34. Each bracket 38 has a flange 42 which extends from the base 40 and which is provided with a hole 44. The brackets 38 are securely fastened to a structural part 46 of the vehicle through flanges 42 as shown by suitable fastening means such as bolts 48 which pass through the holes 44 formed in the flanges 42. The hollow member 30 has a flat section 50 at its one or left end in the drawings. The flat section 50 has formed at an outer end thereof a slot 52. Each of the ends 56 of the shoulder and hip belts 22 and 26 is looped and held in the slot 52 as shown by suitable fastening means such as seams or rivets. With respect of the flat section 50 and the end of the belt, FIGS. 3 and 4 are side views rather than plan views for the purpose of clear illustration. The hollow member 30 has a normal or dormant position in which the other or right end 58 in the drawings of the hollow member 30 rather than the one end thereof is adjacent to the casing 36 as shown in FIG. 3 and a second or active position in which the right end 58 of the hollow member 30 rather than the one end thereof is remote from the casing 36 as shown in FIG. 4. The hollow member 30 is movable between the first and second positions. The casing 36 has an open end 60 which is opposite to the right end 58 of the hollow member 30 and which may normally be closed if desired by destructible closure means 62 such as a flexible diaphragm. The casing 36 accommodates in the chamber 37 a pressurized gas producing medium or producer 64 such as an explosive charge which produces a pressurized gas to impel the hollow member 30 from the first position to the second position when activated by igniting means 66 retained in the gas producer 64 for activating the same when energized in response to a collision, sudden deceleration or shock of the vehicle. The igniting means 66 is connected through a conducting wire 68 to suitable impact sensing means (not shown) installed on the vehicle which, when it senses an impact resulting from a collision of the vehicle, creates a signal transmitted to the igniting means 66 to activate the same. When the tightener 24 is in the first or dormant position shown in FIG. 3, the right side 70 of the base 40 of the bracket 38 abuts against shoulders 72 provided on the hollow member 30 at the right ends of the slots 34 to seat the chamber 32 between the casing 36 and an end plate 74 closing the hollow member 30 to the outside so that the pressure of pressurized gas resulting from activation of the gas producer 64 efficiently acts on the end plate 74. Preferably, the shoulders 72 on the hollow member 30 are located near the end plate 74 to maximize the effect of pressurized gas thrusting the hollow member 30 against the casing 36 when the gas producer 64 is activated. The end plate 74 of the hollow member 30 may be formed to be concave toward the interior of the chamber 32.

In normal collision free driving of the vehicle, the tighteners 24 are in the normal of dormant positions in which the corresponding seat belts are drawn out or extended toward the occupant 10 so that the seat belts are loosely worn to permit normal body movements of the occupant 10.

When, in operation, the vehicle undergoes a collision and the impact sensing means (not shown) senses an impact resulting from the collision, an electric signal is transmitted from the impact sensing means through the conducting wire 68 to the igniting means 66 to energize the same. Energization of the igniting means 66 causes the pressurized gas producer 64 to be activated and to produce pressurized gas in the casing 36. The pressurized gas produced breaks the closure means 62 of the casing 36 if used and gushes from the casing 36 into the chamber 32 of the hollow member 30 between the casing 36 and the end plate 74 to abruptly raise the pressure in the chamber 32. The raised pressure in the chamber 32 acts on the end plate 74 to abruptly move the hollow member 30 from the first position shown in FIG. 3 to the second position shown in FIG. 4. The hollow member 30 thus moved tightens the belt toward the casing 36. Therefore the belts 22 and 26 are tightened so that the occupant 10 is securely fixed to the seat before being moved forward from the seat by the large inertial force applied on the occupant as the result of the collision. The pressurized gas which has been employed to move each hollow member 30 to tighten the belts is gradually discharged from the slots 34 as each hollow member 30 is moved toward the second position shown in FIG. 4. Consequently, the tightened belts are gradually slackened to permit the occupant 10 to perform desired movements.

It will be understood that the seat belts can be loosely worn to impart sufficient freedom to the occupant to perform desired movements in normal collision free driving of a motor vehicle and that the seat belts will be automatically tightened in the event of a collision of the vehicle to securely hold the occupant tightly seated before the occupant is moved forward from the seat by the large inertial force applied on the occupant as the result of the collision by employing the tighteners according to the invention.

Although the bases 40 are shown or formed to lie in the same plane in the embodiment of FIGS. 2 to 4, the bases and accordingly the corresponding slots may be respectively formed to lie in different planes which cross each other at a certain angle. Although the flat section 50 is shown or formed to be parallel with a plane in which the slots 34 or bases 40 lie, the flat section may be formed to be at a certain angle with this plane.

What is claimed is:

1. A safety belt tightener of a vehicle adapted to tighten a safety belt in the event of a collision or sudden deceleration of said vehicle, comprising a hollow member having formed therein a chamber closed at one end thereof and a slot, said slot extending parallel with a longitudinal axis, said hollow member being connected at the other end thereof to said safety belt, a casing fit in said chamber of said hollow member in such a manner that said hollow member is slidable relative to said casing and having an open end opposite to said closed end of said hollow member, a bracket extending from said casing through said slot and fixedly fastened to a stationary part of said vehicle, said hollow member having a first position in which said one end of said hollow member rather than the other end thereof is adjacent to said casing and a second position in which said other end of said hollow member rather than said one end thereof is adjacent to said casing and movable between said first and second positions, and a pressurized gas producer accommodated in said casing and responsive to an impact for producing pressurized gas to move said hollow member from said first position to said second position.

2. A safety belt tightener as claimed in claim 1, in which said hollow member and said casing are of a cylindrical cross section.

3. A safety belt tightener as claimed in claim 1, in which said casing has closure means for closing said open end thereof.

* * * * *